United States Patent
Deshpande et al.

(10) Patent No.: US 11,595,493 B2
(45) Date of Patent: Feb. 28, 2023

(54) SYSTEM AND METHOD FOR NAMESPACE MASKING IN AN INTEGRATION FLOW

(71) Applicant: ORACLE INTERNATIONAL CORPORATION, Redwood Shores, CA (US)

(72) Inventors: Sandeep Deshpande, Bangalore (IN); Prakash Kumar Devta, Bangalore (IN); Ankur Prakash, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 35 days.

(21) Appl. No.: 17/035,493

(22) Filed: Sep. 28, 2020

(65) Prior Publication Data

US 2022/0103648 A1    Mar. 31, 2022

(51) Int. Cl.
*G06F 13/00* (2006.01)
*H04L 67/561* (2022.01)
*H04L 67/00* (2022.01)
*H04L 67/51* (2022.01)
*H04L 67/563* (2022.01)
*H04L 67/568* (2022.01)

(52) U.S. Cl.
CPC .......... *H04L 67/561* (2022.05); *H04L 67/34* (2013.01); *H04L 67/51* (2022.05); *H04L 67/563* (2022.05); *H04L 67/568* (2022.05)

(58) Field of Classification Search
CPC . H04L 67/2804; H04L 67/16; H04L 67/2814; H04L 67/2842; H04L 67/34; H04L 67/561; H04L 67/51; H04L 67/563; H04L 67/568

USPC ......................... 709/245, 224, 223
See application file for complete search history.

(56) References Cited

U.S. PATENT DOCUMENTS

| | | | |
|---|---|---|---|
| 6,687,701 B2 | 2/2004 | Karamanolis et al. | |
| 6,920,461 B2 * | 7/2005 | Hejlsberg | G06F 9/46 |
| 7,120,864 B2 | 10/2006 | Cai et al. | |
| 7,496,565 B2 | 2/2009 | Thind et al. | |

(Continued)

FOREIGN PATENT DOCUMENTS

CN    104484177    4/2015

OTHER PUBLICATIONS

Brahmia, et al., "Changs to XML Namespaces in XML Schemas and their Effects on Associated XML Documents", 11th International Conference on Digital Information Management (ICDIM 2016), pp. 43-50, 8 pages.

(Continued)

*Primary Examiner* — Kenneth R Coulter
(74) *Attorney, Agent, or Firm* — Tucker Ellis LLP (57) ABSTRACT

Systems and methods for namespace masking in an integration flow. In order to mitigate issues arising due to application updates impacting integration flows, during the metadata generation phase, all the elements which are available for operation selection can be cloned and replaced with a new namespace. The original elements are deleted from the metadata. The systems and methods can maintain the original namespace and the element name at a predefined place in the metadata (e.g., as an attribute of the cloned Element). The cloned element in addition to all the original fields of the element, can have one additional field which will store the value of the original namespace.

20 Claims, 9 Drawing Sheets

(56) References Cited

U.S. PATENT DOCUMENTS

| | | | |
|---|---|---|---|
| 7,886,041 B2* | 2/2011 | Outhred | H04L 67/1002 |
| | | | 703/22 |
| 8,209,343 B2* | 6/2012 | Joshi | G06F 9/45558 |
| | | | 718/1 |
| 9,396,205 B1 | 7/2016 | Lewis et al. | |
| 9,652,485 B1 | 5/2017 | Bhargava et al. | |
| 9,747,301 B2 | 8/2017 | Shvachko et al. | |
| 9,805,054 B2 | 10/2017 | Davis et al. | |
| 2003/0131020 A1* | 7/2003 | Karamanolis | G06F 16/10 |
| 2003/0167277 A1* | 9/2003 | Hejlsberg | G06F 9/46 |
| | | | 707/999.102 |
| 2004/0193388 A1* | 9/2004 | Outhred | G06F 11/3664 |
| | | | 703/1 |
| 2005/0166140 A1* | 7/2005 | Cai | G06F 16/838 |
| | | | 707/999.1 |
| 2006/0116985 A1* | 6/2006 | Thind | G06F 16/166 |
| 2010/0088328 A1 | 4/2010 | Joshi et al. | |
| 2014/0006465 A1* | 1/2014 | Davis | G06F 16/1752 |
| | | | 707/827 |
| 2017/0024411 A1* | 1/2017 | Shvachko | G06F 16/178 |
| 2017/0123931 A1 | 5/2017 | Aizman et al. | |
| 2018/0181584 A1* | 6/2018 | Bestler | G06F 16/134 |

OTHER PUBLICATIONS

"Data masking and hiding", Apigee, retrieved from https://docs.apigee.com/api-platform/security/data-masking#maskingsensitivedata-maskingforxmlnamespaces on Mar. 20, 2020, 6 pages.

Halpin, Harry; "XMLVS: Using Namespace Documents for XML Versioning", retrieved from www.ibiblio.org/hhalpin/homepage/notes/xvspaper.html on Mar. 20, 2020, 11 pages.

Luo, et al., "Metadata Namespace Management of Distributed File System", 2015 14th International Symposium on Distributed Computing and Applications for Business Engineering and Science, pp. 21-25, 5 pages.

* cited by examiner

| Clone Namespace 801 | NameSpace Original 802 | NameSpace Updated 803 |
|---|---|---|
| CustomerID | CustomerID_2018 | CustomerID_2019 |
| AttributeID | AttributeID_2018 | |
| CustomerRefID | CustomerRefID_2018 | CustomerRefID_2019 |

SYSTEM AND METHOD FOR NAMESPACE MASKING IN AN INTEGRATION FLOW

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related integration cloud services, and in particular, systems and methods for namespace masking in an integration flow.

BACKGROUND

Integration cloud services (ICS) (e.g., Oracle Integration Cloud Service) are simple and powerful integration platforms in the cloud that assist in the utilization of products, such as Software as a Service (SaaS) and on-premises applications. ICS can be provided as an integration platform as a service (iPaas) and can include a web-based integration designer for point and click integration between applications, a rich monitoring dashboard that provides real-time insight into the transactions.

SUMMARY

In accordance with an embodiment, systems and methods for namespace masking in an integration flow are provided. In order to mitigate issues arising due to application updates impacting integration flows, during the metadata generation phase, all the elements which are available for operation selection can be cloned and replaced with a new namespace. The original elements are deleted from the metadata. The systems and methods can maintain the original namespace and the element name at a predefined place in the metadata (e.g., as an attribute of the cloned Element). The cloned element in addition to all the original fields of the element, can have one additional field which will store the value of the original namespace.

DETAILED DESCRIPTION

The foregoing, together with other features, will become apparent upon referring to the enclosed specification, claims, and drawings. Specific details are set forth in order to provide an understanding of various embodiments. However, it will be apparent that various embodiments may be practiced without these specific details. The enclosed specification and drawings are not intended to be restrictive.

Integration platform as a service, for example, Oracle Integration Cloud Service (ICS), can provide a cloud-based platform for building and deploying integrations flows that connect applications residing in the cloud or on-premises.
Integration Cloud Service FIG. 1 illustrates an ICS platform for designing and executing an ICS integration flow, in according with an embodiment.

Figure 1:
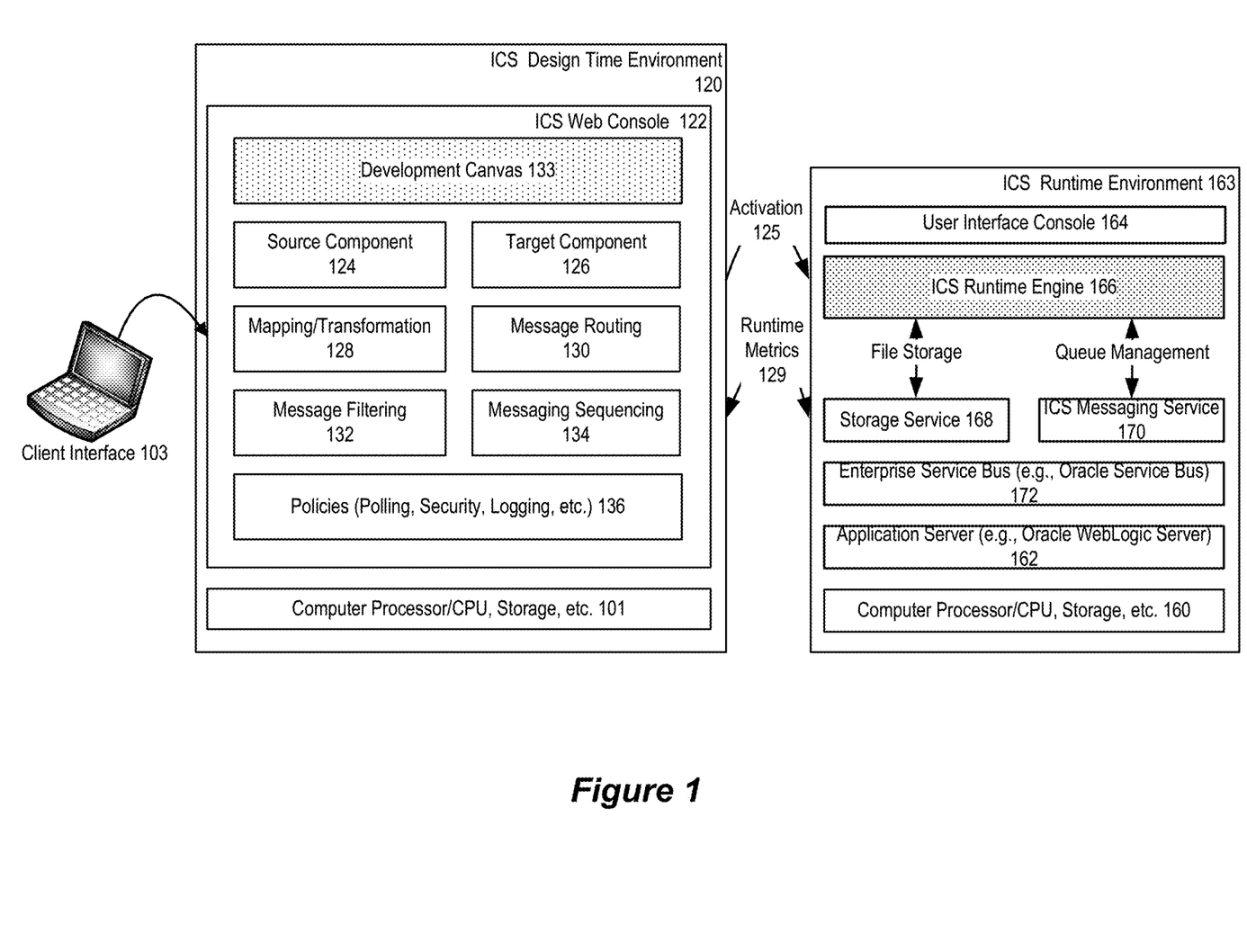
FIG. 1 illustrates an integration cloud service in accordance with an embodiment.

As shown in FIG. 1, the ICS platform can include a design-time environment 120, and a runtime environment 163. Each environment can execute on a computer including one or more processors, for example a computer 101 or 160.

In accordance with an embodiment, the design-time environment includes an ICS web console 122, which provides a browser-based designer to allow an integration flow developer to build integrations using a client interface 103.

In accordance with an embodiment, the ICS design-time environment can be pre-loaded with connections to various SaaS applications or other applications, and can include a source component 124, and a target component 126. The source component can provide definitions and configurations for one or more source applications/objects; and the target component can provide definitions and configurations for one or more target applications/objects. The definitions and configurations can be used to identify application types, endpoints, integration objects and other details of an application/object.

As further shown in FIG. 1, the design-time environment can include a mapping/transformation component 128 for mapping content of an incoming message to an outgoing message, and a message routing component 130 for controlling which messages are routed to which targets based on content or header information of the messages. Additionally, the design-time environment can include a message filtering component 132, for controlling which messages are to be routed based on message content or header information of the messages; and a message sequencing component 134, for rearranging a stream of related but out-of-sequence messages back into a user-specified order. The ICS design time can activate 125 a flow within the runtime environment, and runtime metrics 129 can be exchanged.

In accordance with an embodiment, each of the above of the described components, as with the source and target components, can include design-time settings that can be persisted as part of a flow definition/configuration.

In accordance with an embodiment, a flow definition specifies the details of an ICS integration flow; and encompasses both the static constructs of the integration flow (for example, message routers), and the configurable aspects (for example, routing rules). A fully configured flow definition and other required artifacts (for example, jca and .wsdl files) in combination can be referred to as an ICS project. An ICS project can fully define an integration flow, and can be implemented by an underlying implementation layer.

In accordance with an embodiment, a policies component 136 can include a plurality of policies that govern behaviors of the ICS environment. For example, a polling policy can be configured for source-pull messaging interactions (i.e. query style integrations) for a source application, to invoke an outbound call to the source application via a time-based polling.

In accordance with an embodiment, other policies can be specified for security privileges in routing messages to a target application; for logging message payloads and header fields during a flow execution for subsequent analysis via a monitoring console; and for message throttling used to define a number of instances that an enterprise service bus (ESB) service can spawn to accommodate requests. In addition, policies can be specified for monitoring/tracking an integration flow at a flow level; and for validating messages being processed by the ICS platform against a known schema.

In accordance with an embodiment, an integration developer can drag and drop a component on a development canvas 133 for editing and configuration, for use in designing an integration flow.

As further shown, the runtime environment can include an application server 162, an ICS runtime engine 166, a storage service 168 and a messaging service 170 on top of an enterprise service bus component 172. A user interface console 164 can be used to monitor and track performance of the runtime environment.

Figure 2:
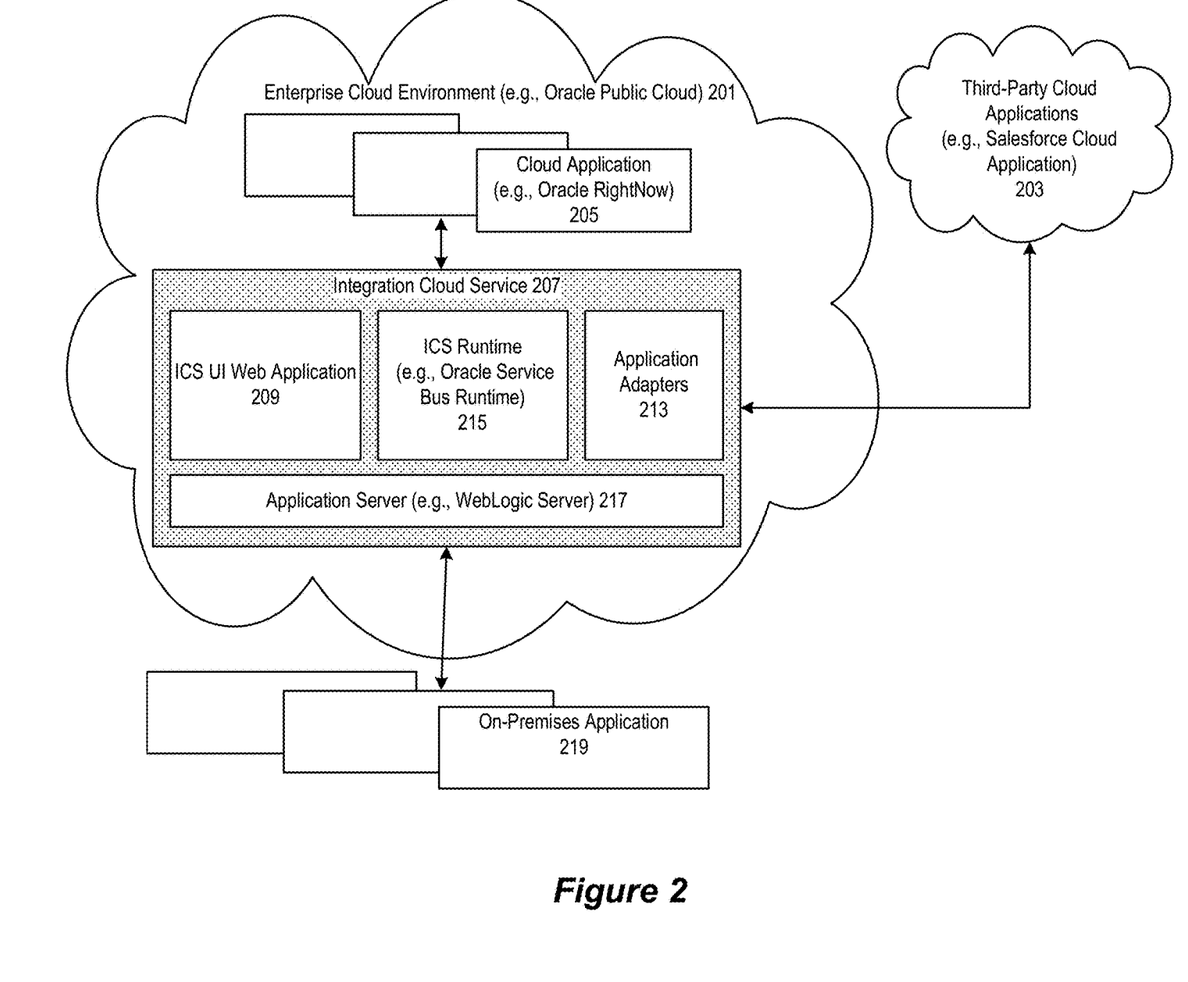
FIG. 2 illustrates an integration cloud service in accordance with an embodiment.

FIG. 2 illustrates an integration cloud service in accordance with an embodiment.

As shown in FIG. 2, an ICS 207 can provide a cloud-based integration service for designing, executing, and managing ICS integration flows. The ICS can include a web application 209 and an ICS runtime 215 executing on an application server 217 in an enterprise cloud environment (for example, Oracle Public Cloud) 201. The web application can provide a design time that exposes a plurality of user interfaces for a user to design, activate, manage, and monitor an ICS integration flow. An activated ICS integration flow can be deployed and executed on the ICS runtime.

In accordance with an embodiment, a plurality of application adapters 213 can be provided to simplify the task of configuring connections to a plurality of applications 203, by handling the underlying complexities of connecting to those applications. The applications can include enterprise cloud applications of the ICS vendor 205, third-party cloud applications (for example, Salesforce) 103, and on-premises applications 219. The ICS can expose simple object access protocol (SOAP) and representational state transfer (REST) endpoints to these applications for use in communicating with these applications.

In accordance with an embodiment, an ICS integration flow (or ICS integration) can include a source connection, a target connection, and field mappings between the two connections. Each connection can be based on an application adapter, and can include additional information required by the application adapter to communicate with a specific instance of an application.

In accordance with an embodiment, an ICS integration flow and a plurality of other required artifacts (for example, JCA and WSDL files) can be compiled into an ICS project, which can be deployed and executed in the ICS runtime. A plurality of different types of integration flow patterns can be created using the web UI application, including data mapping integration flows, publishing integration flows, and subscribing integration flows. To create a data mapping integration flow, an ICS user can use an application adapter or an application connection to define a source application and a target application in the development interface, and define routing paths and data mappings between the source and target application. In a publishing integration flow, a source application or a service can be configured to publish messages to the ICS through a predefined messaging service. In a subscribing integration flow, a target application or service can be configured to subscribe to messages from the ICS through the messaging service.

Figure 3:
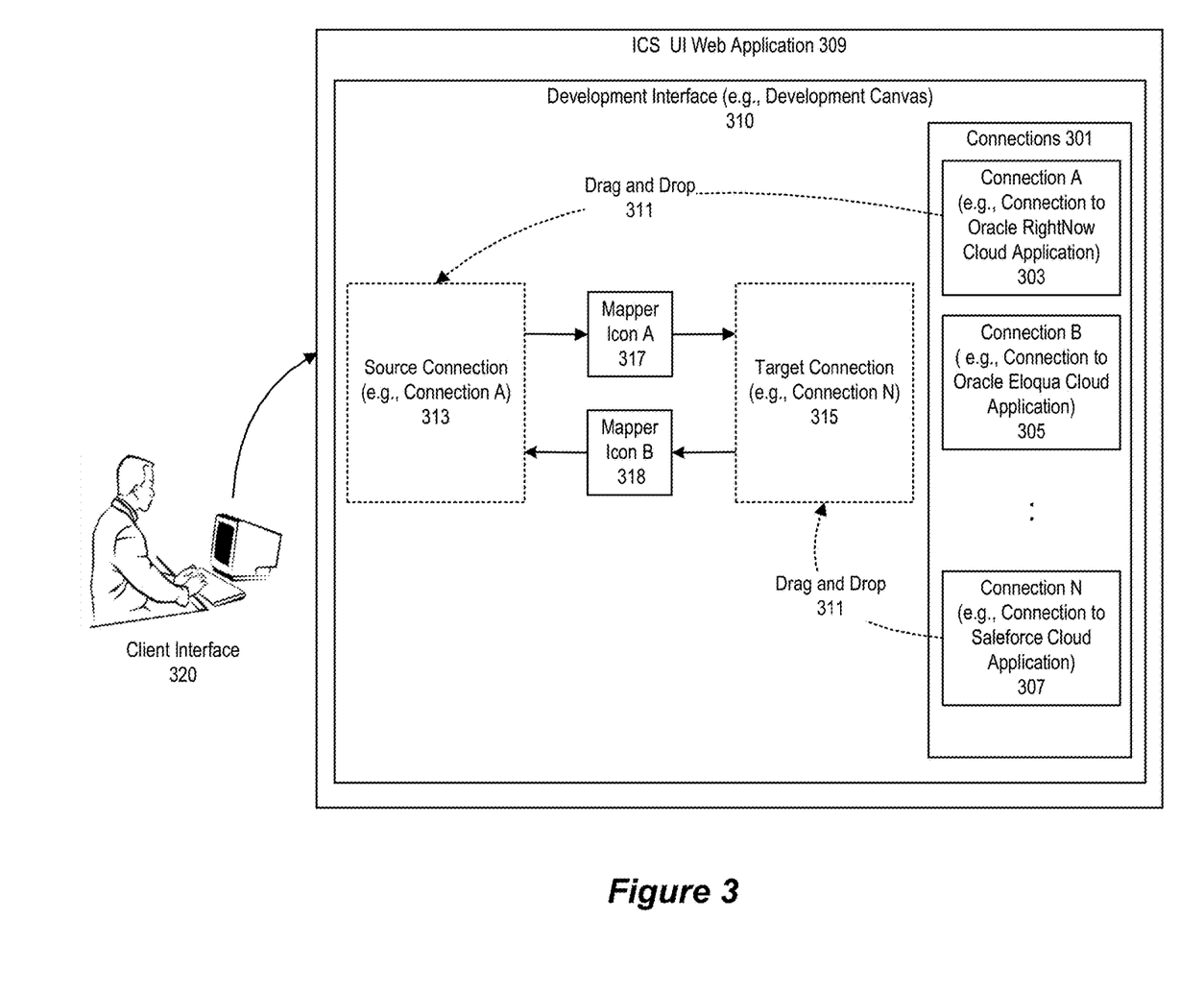
FIG. 3 illustrates an ICS design time, in accordance with an embodiment.

FIG. 3 illustrates an ICS design time, in accordance with an embodiment.

In accordance with an embodiment, a development interface (e.g., a development canvas) 310 in the web UI application 309 can be used by a user 320 to create an ICS integration flow, using a plurality of existing connections 301, for example, connection A 303, connection B 305 and connection N 307.

As shown in FIG. 3, a particular connection (for example, connection A) can be dragged and dropped 311 to the development interface as a source connection 313, and connection N can be dragged and dropped 309 to the development interface as a target connection 315. The source connection can include information required to connect to a source application, and can be used by the ICS to receive requests from the source application. The target connection can include information required to connect to a target application (for example, a Salesforce cloud application), and can be used by the ICS to send requests to the target application.

In accordance with an embodiment, the source and target connections can be further configured to include additional information. For example, the additional information can include types of operations to be performed on data associated with a request, and objects and fields against those operations.

In accordance with an embodiment, once the source and target connections are configured, mappers between the two connections can be enabled, and mapper icons (for example, mapper icon A 317 and mapper icon B 318) can be displayed for use in opening the mappers, so that the user can define how information is transferred between a source and target data objects for both the request and response messages.

In accordance with an embodiment, the mappers can provide a graphical user interface for the user to map items (for example, fields, attributes, and elements) between the source and target applications by dragging a source item onto a target item. When a mapper for a request or response message in an ICS integration flow is opened, the source and target data objects can be automatically loaded using the source and target connections.

In accordance with an embodiment, lookups can be provided to facilitate the creation of mappings. As used herein, lookups are reusable mappings for different codes and terms used in applications to describe the same item. For example, one application uses a specific set of codes to describe countries, while another application uses a different set of codes to describe the same countries. Lookups can be used to map these different codes across the different applications.

As described above, development of an integration flow can be a complex effort requiring various components to be defined before the integration flow can be successfully deployed and executed. Some components within an integration flow are required to be defined while others are optional. Further complicating the development process is that defining optional components may lead to additional required components, and that the required components at any point in time during the development effort may vary, depending upon the order in which the integration components were defined.

Namespace Masking in an Integration Flow

In accordance with an embodiment, an integration flow typically consists of various operations. A flow can start with an inbound operation (trigger) and can consist of other inbound and outbound (invoke) operations. An operation can make use of one more elements. Each of the operations can be tied to a connection which is modeled on a specific version of the endpoint (e.g., an instance of an application external to the integration flow).

In accordance with an embodiment, the operations are weaved together using mapping which is typically done using XSLT and uses XPATH. The mapping maps the request/response of one operation to another. When the connection is updated, the namespace of the elements used in operation will most probably change. This can make the mapping designed earlier invalid. When such occurrences happen, this often necessitates the flow designer to completely redo the mapper. The industry solves this by marking the existing mapping as invalid. The flow developer must then go and manually recreate all the existing mappings, which is a very time consuming and inefficient process.

In accordance with an embodiment, in an integration domain, typically a flow is designed with a series of operations required to be executed. An individual operation can either be inbound request (a trigger) or outbound request (an invoke). An operation can include one or more elements. These elements can belong to a particular namespace.

In accordance with an embodiment, the list of operations, elements, namespaces are derived from an entity called schema. In order to build up a schema, the integration needs a connection. From the connection, the integration gets the required metadata to build up a schema. Because of this, during development of an integration, an integration developer typically first creates all the required connection(s). Then the software automatically derives the metadata for each connection. Then the integration developer creates the operations (either trigger or invoke as discussed above) and weaves them together with mappings. Mappings are typically done using XSLT and involves using XPATH to select the fields for mapping. A flow starts with a trigger operation. After that, the flow can consist of any number of trigger and invoke operations as required. The mapping part transforms the request/response of one operation to the request/response of another operation.

Figure 4:
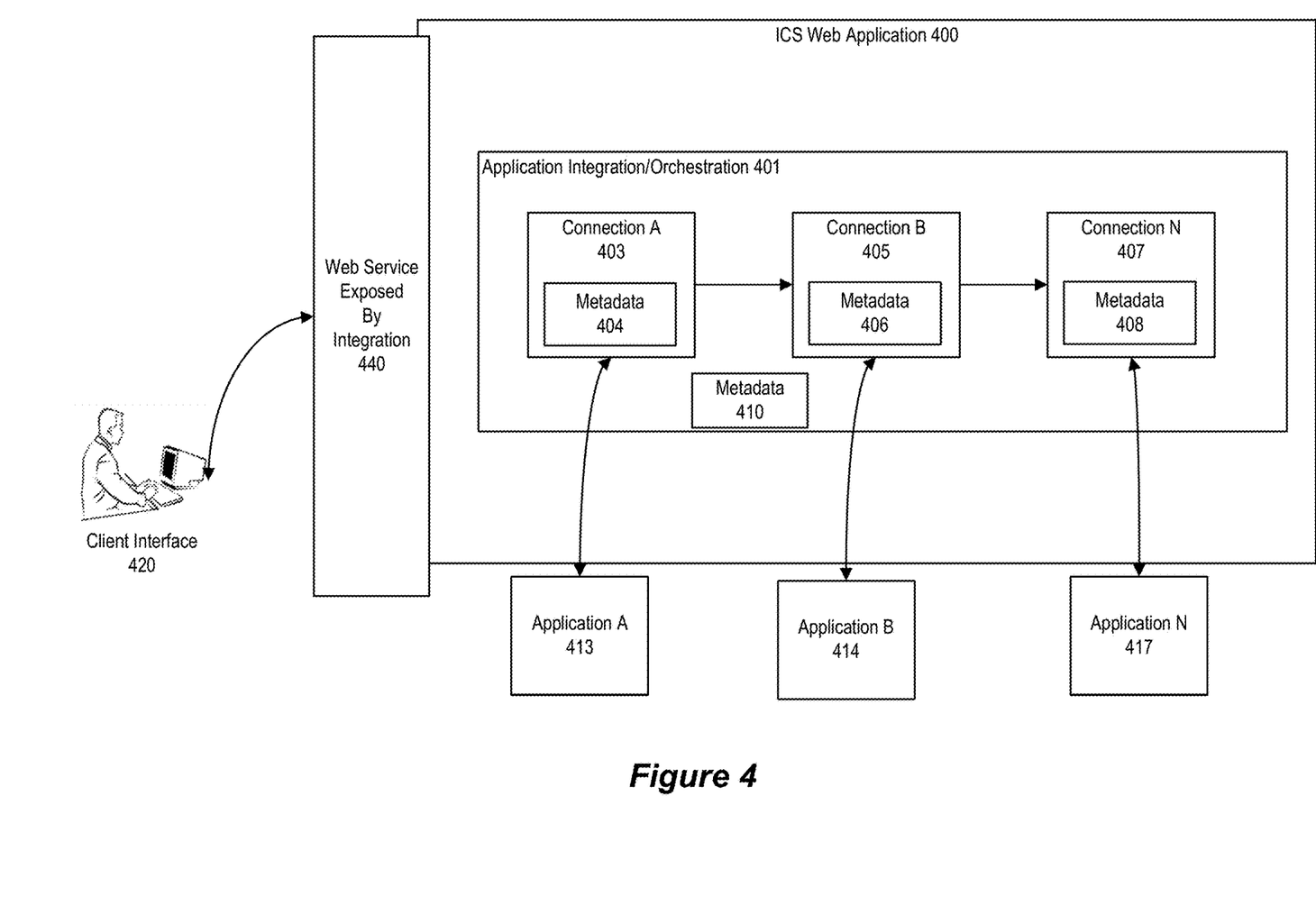
FIG. 4 illustrates a system for supporting a declarative non code self-learning advisory framework in an orchestration based application integration, in accordance with an embodiment.

FIG. 4 illustrates a system for namespace masking in an integration flow, in accordance with an embodiment.

In accordance with an embodiment, an ICS Web Application 400 can comprise an application integration/orchestration 401 tool that can be used to design, test, and/or run an orchestration, such as the orchestration comprising connection A 403, connection B 405, and connection N 407. Each of the connections can be associated with or linked with an application, such as applications A and N 413 and 417, as shown in the figure. Integrations can additionally be associated with more or fewer connections/connectors (not shown), which can additionally be associated with additional applications (not shown).

In accordance with an embodiment, a user, via a client interface 420, can access a web service exposed by an integration 440. Via this web service, the user can interact with the application integration to, for example, design, test, or run orchestrations, such as orchestration 401.

In accordance with an embodiment, each of the connections, connection A-N, can be associated with a set of metadata, such as metadata 404, 406, and 408. Such metadata can be associated with the connection, and can be derived, e.g., from associated applications, such as application A 413, application B 414, and application N 417.

In accordance with an embodiment, the orchestration 401 shown in the figure can be associated with metadata 410 (which can be exposed/published to the client interface via the web service 440). Such metadata 410 can comprise a total metadata profile for the orchestration, which can, for example, represent a lowest common denominator for the orchestration, as well as other attributes and capabilities of the complete orchestration.

FIG. 4 illustrates a system for namespace masking in an integration flow, in accordance with an embodiment.

In accordance with an embodiment, an ICS Web Application 400 can comprise an application integration/orchestration 401 tool that can be used to design, test, and/or run an orchestration, such as the orchestration comprising connection A 403, connection B 405, and connection N 407. Each of the connections can be associated with or linked with an application, such as applications A and N 413 and 417, as shown in the figure. Integrations can additionally be associated with more or fewer connections/connectors (not shown), which can additionally be associated with additional applications (not shown).

In accordance with an embodiment, a user, via a client interface 420, can access a web service exposed by an integration 440. Via this web service, the user can interact with the application integration to, for example, design, test, or run orchestrations, such as orchestration 401.

In accordance with an embodiment, each of the connections, connection A-N, can be associated with a set of metadata, such as metadata 404, 406, and 408. Such metadata can be associated with the connection, and can be derived, e.g., from associated applications, such as application A 413, application B 414, and application N 417.

In accordance with an embodiment, the orchestration 401 shown in the figure can be associated with metadata 410 (which can be exposed/published to the client interface via the web service 440). Such metadata 410 can comprise a total metadata profile for the orchestration, which can, for example, represent a lowest common denominator for the orchestration, as well as other attributes and capabilities of the complete orchestration. The metadata (both at the connections 403, 405, and 407, as well as an overall metadata 410) can additionally comprise a namespace associated with the linked applications.

Figure 5:
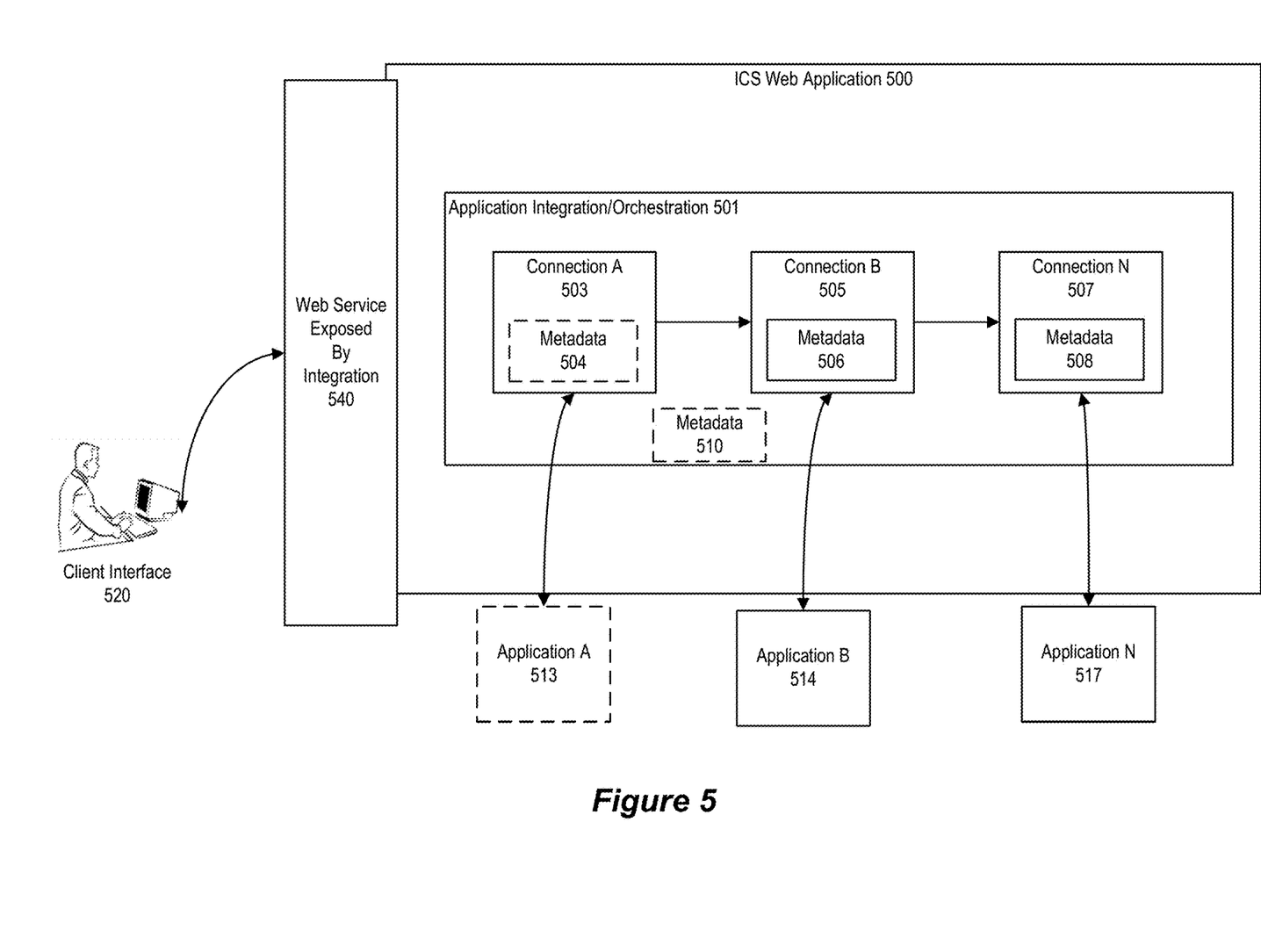
FIG. 5 shows an exemplary mapping, in accordance with an embodiment.

FIG. 5 illustrates a system for namespace masking in an integration flow, in accordance with an embodiment.

In accordance with an embodiment, an ICS Web Application 500 can comprise an application integration/orchestration 501 tool that can be used to design, test, and/or run an orchestration, such as the orchestration comprising connection A 503, connection B 505, and connection N 507. Each of the connections can be associated with or linked with an application, such as applications A and N 513 and 517, as shown in the figure. Integrations can additionally be associated with more or fewer connections/connectors (not shown), which can additionally be associated with additional applications (not shown).

In accordance with an embodiment, a user, via a client interface 520, can access a web service exposed by an integration 540. Via this web service, the user can interact with the application integration to, for example, design, test, or run orchestrations, such as orchestration 501.

In accordance with an embodiment, each of the connections, connection A-N, can be associated with a set of metadata, such as metadata 504, 506, and 508. Such metadata can be associated with the connection, and can be derived, e.g., from associated applications, such as application A 513, application B 514, and application N 517.

In accordance with an embodiment, the orchestration 501 shown in the figure can be associated with metadata 510 (which can be exposed/published to the client interface via the web service 440). Such metadata 510 can comprise a total metadata profile for the orchestration, which can, for example, represent a lowest common denominator for the orchestration, as well as other attributes and capabilities of the complete orchestration. The metadata (both at the connections 503, 505, and 507, as well as an overall metadata 510) can additionally comprise a namespace associated with the linked applications.

In accordance with an embodiment, FIG. 5 illustrates issues that may arise when an application, such as Application A 513 (shown as a dashed line), undergoes an update, such as a new version being released. On such instances, the metadata and namespaces 504 derived from the application 513 can change, as shown by the dashed lines at 504 and 510.

In accordance with an embodiment, a problem can occur on such an update to a connection, e.g., Connection A 503, when it is updated, when a connection is updated. In such situations, as discussed above, the integration developer may need to redo a mapping.

Figure 6:
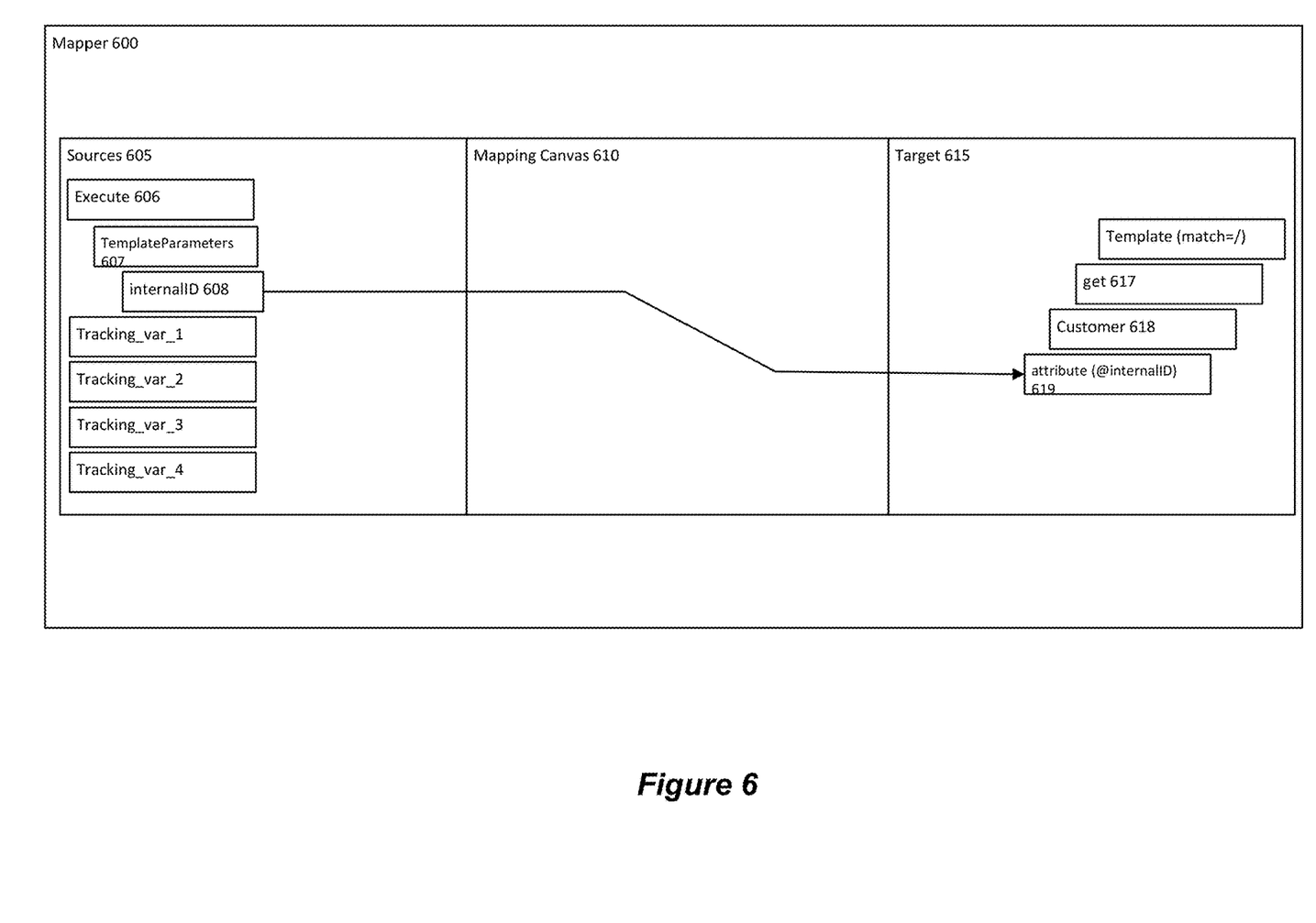
FIG. 6 shows an exemplary mapping, in accordance with an embodiment.

FIG. 6 shows an exemplary mapping, in accordance with an embodiment.

In accordance with an embodiment, more particularly, a mapper 600 (such as software), provides a mapping between sources 605, via a mapping canvas 610, to the targets 615 of a mapped operation. Such sources and targets can comprise derived metadata from external applications, as well as derived namespaces.

In accordance with an embodiment, for example, as shown in FIG. 6, a simple flow can comprise a Rest trigger operation and a "NetApp invoke" operation (a trigger operation with a JSON payload and a "get" operation of customer entity in NetApp). An inbound request comes in as JSON Payload (in this example, it can be triggered whenever REST endpoint is called with a JSON payload), then there is a mapper 600 software, mapping payload elements (sources 605) from the REST trigger to NetApp get customer operation. A NetApp "get" 617 operation typically requires what is called internalID 608. More particularly, FIG. 6 shows a visual representation of the mapping (e.g., as represented on a console).

In accordance with an embodiment, in referring to FIG. 6, internalID 608 (which is below the execute 606, within the template parameters 607, from the REST trigger JSON payload is mapped to the invoke NetApp "get" 617 operation request for customer 618 element whose attribute 619 is internalID. The customer element defined in the invoke operation is chosen from the schema derived from metadata which is related to the NT connection. The customer element belongs to particular namespace.

In accordance with an embodiment, a problem occurs when a connection is updated. In such situations, as discussed above, the integration developer may need to redo the mapping. Connections are typically updated to get new features developed and because a particular version may be going end of life. Once connection is updated to get a list of operations, elements, fields from a new updated WSDL (web service definition language) (for, e.g., the WSDL which was earlier specific to 2018 version is now updated to 2019 version. Do recall from earlier, that elements, fields and operations are derived from the connection). The metadata associated with connection will be changed too. And there is a high probability that the namespace of the element may change as well, in order to reflect the updated connection details.

In accordance with an embodiment, for example, in a first version of NetApp connection, a customer element namespace may originally contain something like this *2018_version*. On an update of the connection in version 2.0, the same customer element namespace may contain get changed to *2019_version*. Such a change in the namespace, however, can render a prior mapping, such as that shown in FIG. 6, invalid as the earlier developed mapping maps to customer element in *2018_version* namespace, which is no longer defined in the updated version of the connection. Essentially this means the mapping in new version is invalid. As a result, the mapping needs to be manually redone by the integration flow developer to reflect the changed namespaces. This is a time-consuming and repetitive process, especially for complex flows and operations which require many elements to be mapped. In addition, it could very well be that between version1 and version2 of NetApp connection, the customer element has not changed at all.

In accordance with an embodiment, in order to mitigate the problems described above, during the metadata generation phase, all the elements which are available for operation selection can be cloned/aliased and replaced with a new namespace. The original elements are deleted from the metadata. The systems and methods can maintain the original namespace and the element name at a predefined place in the metadata (e.g., as an attribute of the cloned/alias Element). So the cloned/alias element in addition to all the original fields of the element, will have one additional field which will store the value of the original namespace.

In accordance with an embodiment, for example, suppose a customer element was earlier in namespace *2018* version, now the namespace is changed to *xmlns.oracle.com/NT_ADAPTER/Customer*.

In accordance with an embodiment, following the above example, during the design phase of the invoke operation, when the customer element is chosen, the integration software chooses the cloned/alias Customer Element. The mapping is now done on the cloned/alias Customer Element. Once design is done, integration developer can activate the flow. This is done to signal that flow can be operational. During the activation, for an operation, the systems and methods make a list of all the elements required and from the predetermined place in metadata, retrieve the real namespace and note it down in operation properties (called JCA properties). The JCA property is a map of all the elements required for the operation and their namespaces. For example, "NamespaceMasking: {Customer→2018_version, Opportunity→2018_version}. This is necessary because during runtime, the systems and methods need the actual namespaces that the connection endpoint expects. So the systems and methods can utilize the renameNode API provided by Dom parser and change the namespace from the internal one(xmlns.oracle.com/NETSUITE_ADAPTER/Customer) to the real one.

In accordance with an embodiment, the methods and systems described herein can support the updating of a connection, and the integration flow developer/designer does not need to redo the entire mapping for the operation.

In accordance with an embodiment, here are some exemplary situations where a connection is updated:

1) Customer element definition does not change between the two versions, hence no change to mapping required. As the schema remains the same.

2) New fields added in the newer version of Customer elements. Again, existing mapping works, as they have not used the new fields.

3) Existing fields from older version are deleted from newer version. This can be a problem if the deleted field(s) were used in mapping. If the deleted field(s) were not used in the mapping, then nothing needs to be changed. If the delete field(s) were used, the mappings for that deleted field(s) will have to be redone. However, as opposed to completely redoing the mapping, flow developer only needs to redo a small portion of the mapping. In this scenario, when connection is updated, on the console, the software can give a warning that there is an existing flow associated with this connection whose mapping for a particular operation needs to be changed. This is done by the integration software examining the mapping and the JCA property created earlier and figuring out, that one of the fields is no longer valid.

In accordance with an embodiment, when the connection is updated, a flow developer can examine the message on the console which will indicate if the mapping remains valid or not. If it is valid, which will be the case most of the time, the integration developer/designer can activate the flow. Automatically during activation, the software adds the new element,namespace map values to the JCA property (NamespaceMasking). The integration software will pick it up from the updated metadata which has the updated namespace, elements from the updated connection.

In accordance with an embodiment, the systems and methods described herein ensure that when a connection is updated to reflect a new version, it ensures that there is no major manual involvement to redo the mapping. This ensures that the software checks that no remapping work is required, or if necessary, a remapping effort is required. Mapping can be very complex and involve many elements. This frees up the integration flow developer to do other productive tasks rather than redoing a repetitive task.

In accordance with an embodiment, when a new connection is created, metadata from that connection is created. The systems and methods make a list of all the elements which will be available for operations and clones each one of them (e.g., to JCA properties). Each of the cloned elements can be tied to a new internally defined namespace. The cloned element will also maintain the old namespace as a property of the cloned element in the metadata. This metadata with the cloned elements is made available for designing the operation. When the flow is activated, the systems and methods can add an operation property, e.g., "NamespaceMasking", which consists of all the element and original namespace. During runtime, the integration flow can use this to substitute the actual namespace values required by the connection endpoint.

Figure 7:
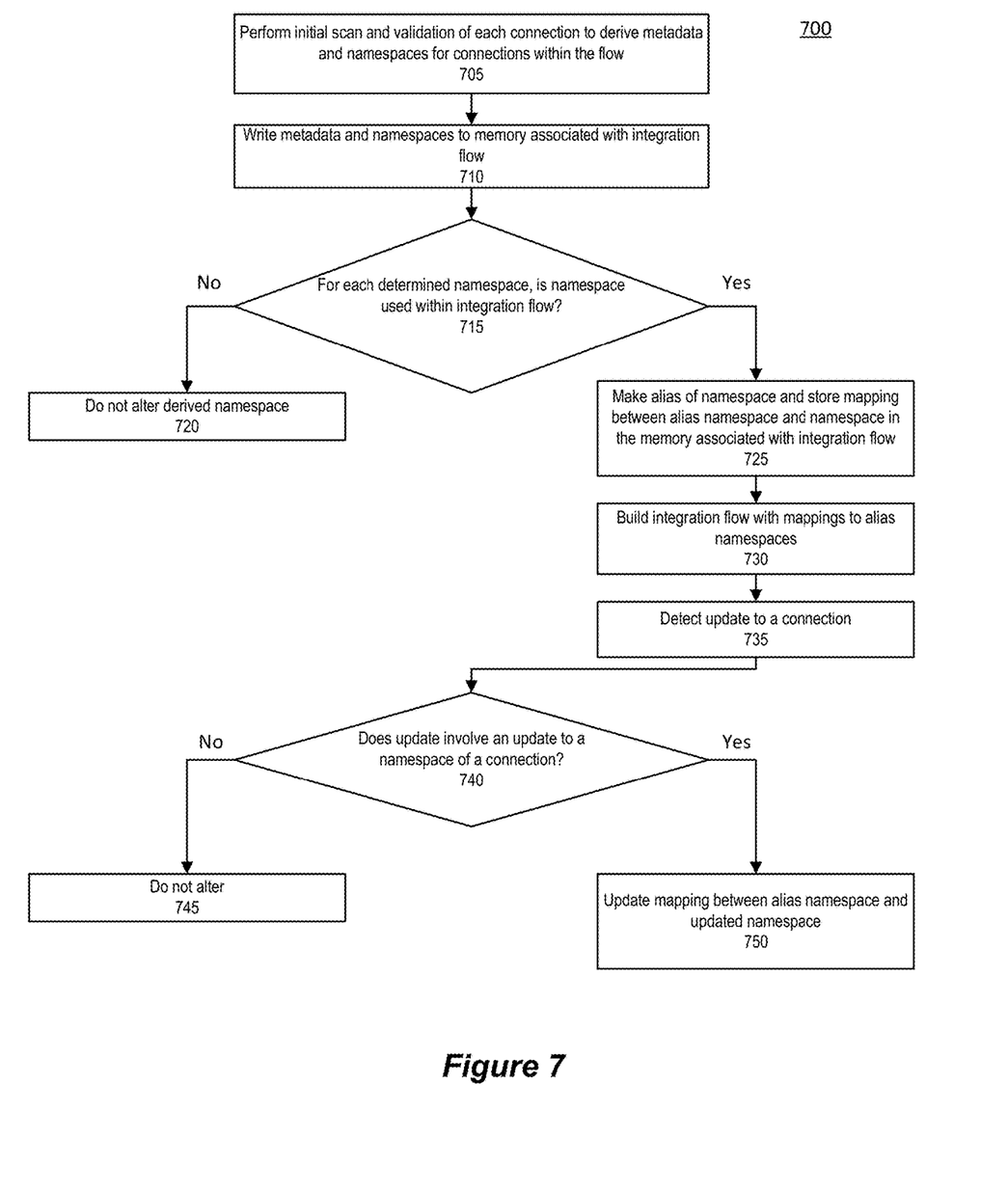
FIG. 7 is a flowchart of a method for supporting namespace masking in an integration flow, in accordance with an embodiment.

FIG. 7 is a flowchart of a method for supporting namespace masking in an integration flow, in accordance with an embodiment.

In accordance with an embodiment, a method 700 can begin at step 705 by scanning and validating each connection of an integration (one or more connections) to derive metadata and namespaces for the connections within the integration flow. Such metadata and namespaces are determined, at least in part, based upon an application (external or internal) to which the connection points to. At step 710, such derived metadata and namespaces can be stored/written at a memory associated with the integration flow.

In accordance with an embodiment, at step 715, for each determined namespace, it can be determined whether the namespace is used in the integration flow. If not, then at step 720, the namespace can be left alone.

In accordance with an embodiment, at step 725, for each determined namespace that is used in the integration flow, an alias/clone version of the namespace can be created and stored in the memory. In addition, each alias namespace is stored together with a mapping to each respective derived namespace used in the integration flow. Such alias namespaces and mappings can be stored at the memory associated with the integration flow.

In accordance with an embodiment, at step 730, the method can build the integration flow utilizing the alias namespaces for mappings within the integration flow instead of the derived namespaces. Upon executing the integration, the methods and systems can automatically utilize the mappings stored in memory to utilize the derived namespaces from the connection instead by looking such namespaces up using an alias namespace.

In accordance with an embodiment, at step 735, an update to a connection can be detected.

In accordance with an embodiment, at 740, it can be determined whether the update to the connection includes an update to a namespace that is utilized in the integration flow.

In accordance with an embodiment, at 745, if not, then the alias namespaces and their mappings remain unchanged.

In accordance with an embodiment, at 750, if a namespace utilized in the integration flow is updated upon the update to the connection, then the mapping between the alias namespace and old namespace can be updated for the alias namespace to point to the new/updated derived namespace.

In accordance with an embodiment, in this way then, an integration flow developer does not have to change the mappings with respect to namespaces as the integration flow maps to an alias namespace, which does not itself change on an update to a connection, but rather its mapping to can be altered to reflect the new namespace.

Figure 8:
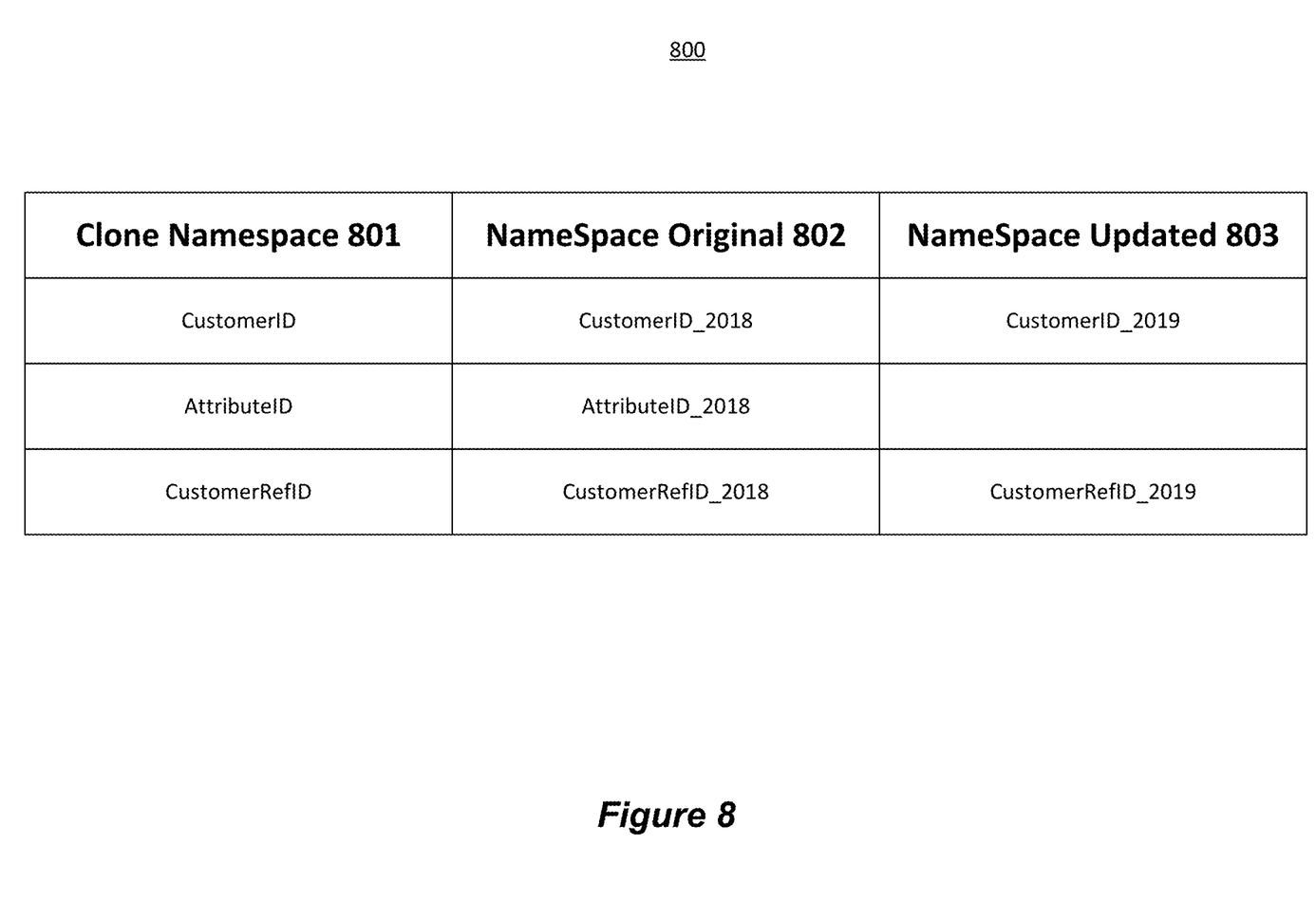
FIG. 8 illustrates an exemplary mapping between alias namespaces and versions namespaces.

FIG. 8 illustrates an exemplary mapping between alias namespaces and versions namespaces.

In accordance with an embodiment, stored in a memory associated with the integration flow, there can be provided a mapping table 800 that comprises entries for cloned/alias namespaces 801 that are mapped to original namespaces 802 that are derived from a scan of an integration flow.

In accordance with an embodiment, upon an update to a connection, namespaces can be updated, as shown in 803, where two of the namespaces, namely CustomerID_2018 and CustomerRefID_2018 are updated to be CustomerID_2019 and CustomerRefID_2019, while AttributeID_2018 remains unchanged. In such a situation, then, the mappings for alias/clone namespace CustomerID and CustomerRefID can be update to reflect new mappings to the updated namespaces, while the mapping for AttributeID can remain unchanged.

Figure 9:
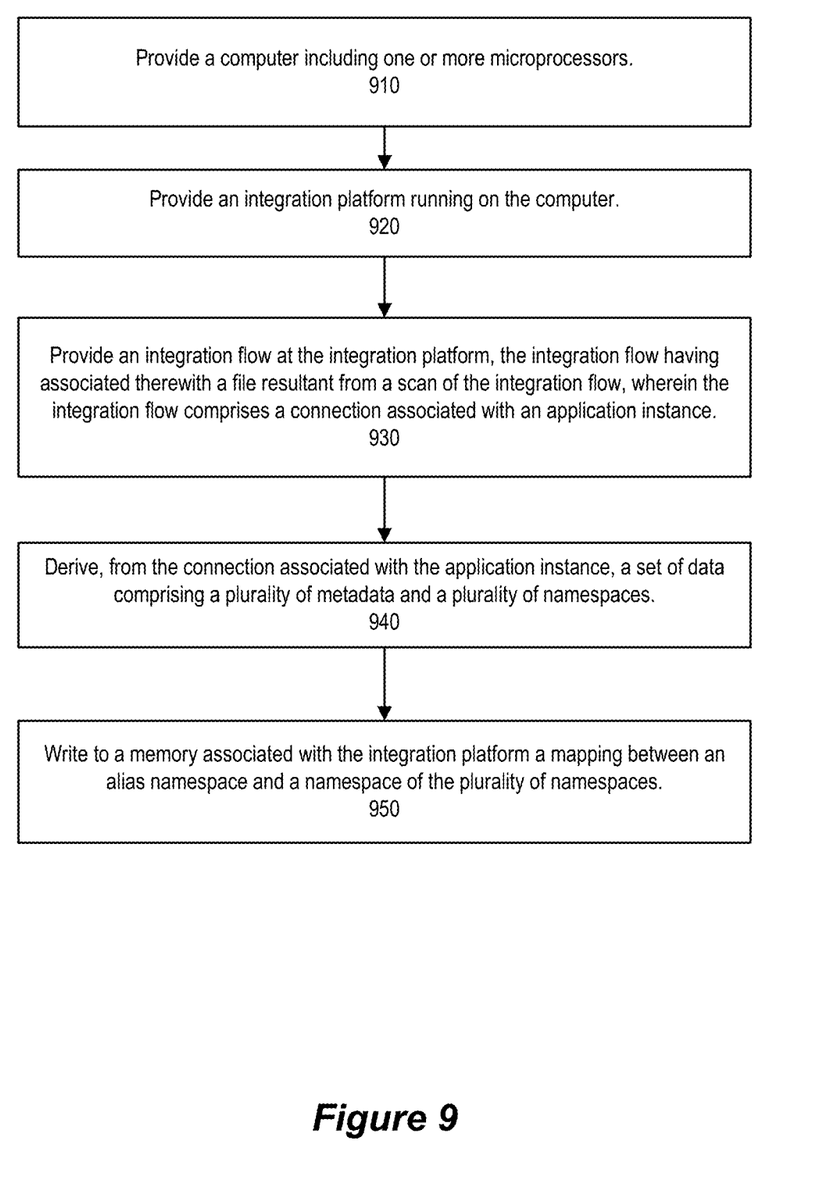
FIG. 9 is a flowchart of a method for supporting namespace masking in an integration flow, in accordance with an embodiment.

FIG. 9 is a flowchart of a method for supporting namespace masking in an integration flow, in accordance with an embodiment.

In accordance with an embodiment, at step 910, the method can provide a computer including one or more microprocessors.

In accordance with an embodiment, at step 920, the method can provide an integration platform running on the computer.

In accordance with an embodiment, at step 930, the method can provide an integration flow at the integration platform, the integration flow having associated therewith a file resultant from a scan of the integration flow, wherein the integration flow comprises a connection associated with an application instance.

In accordance with an embodiment, at step 940, the method can derive, from the connection associated with the application instance, a set of data comprising a plurality of metadata and a plurality of namespaces.

In accordance with an embodiment, at step 950, the method can write to a memory associated with the integration platform a mapping between an alias namespace and a namespace of the plurality of namespaces.

While various embodiments of the present invention have been described above, it should be understood that they have been presented by way of example, and not limitation. The embodiments were chosen and described in order to explain the principles of the invention and its practical application. The embodiments illustrate systems and methods in which the present invention is utilized to improve the performance of the systems and methods by providing new and/or improved features and/or providing benefits such as reduced resource utilization, increased capacity, improved efficiency, and reduced latency.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in the cloud as part of, or as a service of, a cloud computing system based on shared, elastic resources delivered to users in a self-service, metered manner using Web technologies. There are five characteristics of the cloud (as defined by the National Institute of Standards and Technology: on-demand self-service; broad network access; resource pooling; rapid elasticity; and measured service. Cloud deployment models include: Public, Private, and Hybrid. Cloud service models include Software as a Service (SaaS), Platform as a Service (PaaS), Database as a Service (DBaaS), and Infrastructure as a Service (IaaS). As used herein, the cloud is the combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer readable medium is a non-transitory storage medium or non-transitory computer readable medium.

The foregoing description is not intended to be exhaustive or to limit the invention to the precise forms disclosed. Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention. Further, while the various embodiments describe particular combinations of features of the invention it should be understood that different combinations of the features will be apparent to persons skilled in the relevant art as within the scope of the invention such that features of one embodiment may incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention. It is intended that the broader spirit and scope of the invention be defined by the following claims and their equivalents.

What is claimed is:

1. A system for namespace masking in an integration flow, comprising:
    a computer including one or more microprocessors;
    an integration platform running on the computer;
    the integration flow at the integration platform, the integration flow having associated therewith a file resultant from a scan of the integration flow, wherein the integration flow comprises a connection associated with an application instance;
    wherein a set of data is derived from the connection associated with the application instance, the set of data comprising a plurality of metadata and a plurality of namespaces; and
    wherein a mapping between an alias namespace and a namespace of the plurality of namespaces is written to a memory associated with the integration platform.

2. The system of claim 1,
    wherein the alias namespace is targeted by an operation within the integration flow.

3. The system of claim 2,
    wherein the integration flow is executed, wherein upon the execution of the integration flow, the mapping between the alias namespace and the namespace of the plurality of namespaces is utilized to lookup the namespace for use in the execution of the integration flow.

4. The system of claim 2,
    wherein an update to the application instance is detected.

5. The system of claim 4,
    wherein that the namespace of the plurality of namespaces is determined to have undergone an update pursuant to the update of the application instance.

6. The system of claim 5,
    wherein the mapping between the alias namespace and the namespace of the plurality of namespaces is removed from the memory; and
    wherein a mapping between the alias namespace and the updated namespace is written to the memory.

7. The system of claim 6,
    wherein the integration flow is executed, wherein upon the execution of the integration flow, the mapping between the alias namespace and the updated namespace is utilized to lookup the updated namespace for use in the execution of the integration flow.

8. A method for namespace masking in an integration flow, comprising:
    providing a computer including one or more microprocessors;
    providing an integration platform running on the computer;
    providing the integration flow at the integration platform, the integration flow having associated therewith a file resultant from a scan of the integration flow, wherein the integration flow comprises a connection associated with an application instance;
    deriving, from the connection associated with the application instance, a set of data comprising a plurality of metadata and a plurality of namespaces; and
    writing to a memory associated with the integration platform a mapping between an alias namespace and a namespace of the plurality of namespaces.

9. The method of claim 8, further comprising:
    targeting, by an operation within the integration flow, the alias namespace.

10. The method of claim 9, further comprising:
    executing the integration flow, wherein upon the execution of the integration flow, the mapping between the alias namespace and the namespace of the plurality of namespaces is utilized to lookup the namespace for use in the execution of the integration flow.

11. The method of claim 9, further comprising:
    detecting an update to the application instance.

12. The method of claim 11, further comprising:
    determining that the namespace of the plurality of namespaces has undergone an update pursuant to the update of the application instance.

13. The method of claim 12, further comprising:
    removing from the memory the mapping between the alias namespace and the namespace of the plurality of namespaces; and
    writing to the memory a mapping between the alias namespace and the updated namespace.

14. The method of claim 13, further comprising:
    executing the integration flow, wherein upon the execution of the integration flow, the mapping between the alias namespace and the updated namespace is utilized to lookup the updated namespace for use in the execution of the integration flow.

15. A non-transitory computer readable storage medium, having instructions thereon for namespace masking in an integration flow, which when read an executed cause a computer to perform steps comprising:
    providing the computer including one or more microprocessors;
    providing an integration platform running on the computer;
    providing the integration flow at the integration platform, the integration flow having associated therewith a file resultant from a scan of the integration flow, wherein the integration flow comprises a connection associated with an application instance;
    deriving, from the connection associated with the application instance, a set of data comprising a plurality of metadata and a plurality of namespaces; and
    writing to a memory associated with the integration platform a mapping between an alias namespace and a namespace of the plurality of namespaces.

16. The non-transitory computer readable storage medium of claim 15, the steps further comprising:
    targeting, by an operation within the integration flow, the alias namespace.

17. The non-transitory computer readable storage medium of claim 16, the steps further comprising:
    executing the integration flow, wherein upon the execution of the integration flow, the mapping between the alias namespace and the namespace of the plurality of namespaces is utilized to lookup the namespace for use in the execution of the integration flow.

18. The non-transitory computer readable storage medium of claim 16, the steps further comprising:
    detecting an update to the application instance.

19. The non-transitory computer readable storage medium of claim 18, the steps further comprising:
    determining that the namespace of the plurality of namespaces has undergone an update pursuant to the update of the application instance.

20. The non-transitory computer readable storage medium of claim 18, the steps further comprising:
    removing from the memory the mapping between the alias namespace and the namespace of the plurality of namespaces;

writing to the memory a mapping between the alias namespace and the updated namespace; and executing the integration flow, wherein upon the execution of the integration flow, the mapping between the alias namespace and the updated namespace is utilized to lookup the updated namespace for use in the execution of the integration flow.

* * * * *